United States Patent
Greenwood

(10) Patent No.: US 9,540,752 B2
(45) Date of Patent: Jan. 10, 2017

(54) TINKLE-FREE KNITTED WIRE MESH FILTERS AND METHODS FOR MAKING SUCH FILTERS

(71) Applicant: ACS Industries, Inc., Lincoln, RI (US)

(72) Inventor: George Greenwood, Tiverton, RI (US)

(73) Assignee: ACS Industries, Inc., Lincoln, RI (US)

( * ) Notice: Subject to any disclaimer, the term of this patent is extended or adjusted under 35 U.S.C. 154(b) by 480 days.

(21) Appl. No.: 13/782,237

(22) Filed: Mar. 1, 2013

(65) Prior Publication Data

US 2014/0245578 A1    Sep. 4, 2014

(51) Int. Cl.

| | |
|---|---|
| *C08G 73/10* | (2006.01) |
| *D06C 25/00* | (2006.01) |
| *D04B 9/42* | (2006.01) |
| *B01D 39/12* | (2006.01) |
| *D06H 7/02* | (2006.01) |
| *D06H 7/22* | (2006.01) |
| *D04B 1/14* | (2006.01) |

(52) U.S. Cl.
CPC .............. *D06C 25/00* (2013.01); *B01D 39/12* (2013.01); *D04B 1/14* (2013.01); *D04B 9/42* (2013.01); *D06H 7/02* (2013.01); *D06H 7/228* (2013.01); *D10B 2505/04* (2013.01)

(58) Field of Classification Search
CPC ............ D04B 19/00; D04B 1/14; D04B 9/42; D06C 25/00; D06H 7/04; D06H 7/228; D10B 2505/04
USPC ..... 28/1, 2, 170, 142, 168, 171; 245/1, 5, 2; 55/525; 66/202

See application file for complete search history.

(56) References Cited

U.S. PATENT DOCUMENTS

| | | | |
|---|---|---|---|
| 479,639 A |   | 7/1892 | Gearhart |
| 1,569,140 A | * | 1/1926 | Querns .......................... 66/201 |
| 2,001,281 A | * | 5/1935 | Mayer ............................ 66/202 |
| 2,412,562 A | * | 12/1946 | Crawshaw ............. D03D 25/00 |
| | | | 139/425 R |
| 2,437,735 A |   | 3/1948 | Getaz |
| 2,811,029 A | * | 10/1957 | Conner ...................... 66/172 R |
| 3,780,872 A |   | 12/1973 | Pall |

(Continued)

FOREIGN PATENT DOCUMENTS

EP    2 270 270 A1    1/2011

OTHER PUBLICATIONS

Spencer, David, Knitting Technology: A comprehensive handbook and practical guide, 3rd ed., 2001, Woodhead Publishing Limited, Cambridge, England, pp. 24-25, 101-102.

*Primary Examiner* — Anna Kinsaul
*Assistant Examiner* — Jillian K Pierorazio
(74) *Attorney, Agent, or Firm* — Maurice M. Klee

(57) ABSTRACT

"Tinkles" (also known as "gotchas") (see reference number 20 in FIGS. 1 and 2) are portions of knitted metal loops produced when a tube of knitted wire mesh is cut into individual pieces. In the prior art, tinkles have been considered a fact of life and the approach has been to try to shake them out of the mesh or immobilize them on or in the mesh. By producing a knitted tube (11) having alternating segments (12,13) of knitted rows of yarn and knitted rows of wire, completely tinkle-free knitted socks are produced which are used to produce completely tinkle-free knitted wire mesh filters. Knitted wire mesh filters that cannot release tinkles because they do not have any tinkles can be used in such applications as fuel filters and airbag filters.

16 Claims, 5 Drawing Sheets

(56) References Cited

U.S. PATENT DOCUMENTS

| | | | |
|---|---|---|---|
| 3,945,096 A * | 3/1976 | Miranker | D06H 7/225 |
| | | | 28/168 |
| 3,974,525 A | 8/1976 | Jansen | |
| 4,033,151 A | 7/1977 | Jansen | |
| 4,052,238 A | 10/1977 | Botvin | |
| 4,759,106 A * | 7/1988 | McPeak et al. | D04B 1/24 |
| | | | 28/168 |
| 4,773,135 A * | 9/1988 | Sato et al. | 28/160 |
| 5,217,515 A * | 6/1993 | Guglielmi | 55/526 |
| 5,346,252 A | 9/1994 | Levosinski | |
| 5,849,054 A | 12/1998 | Fujisawa | |
| 6,161,399 A * | 12/2000 | Jayaraman | 66/170 |
| 7,000,295 B2 | 2/2006 | Andrews | |
| 7,025,797 B2 | 4/2006 | Zettel | |
| RE39,611 E | 5/2007 | Zettel et al. | |
| 7,559,146 B2 | 7/2009 | Greenwood | |
| 7,637,979 B2 | 12/2009 | Ushikoshi et al. | |
| 2004/0055262 A1 | 3/2004 | Zettel | |
| 2005/0069685 A1* | 3/2005 | Andrews | 428/200 |

\* cited by examiner

PRIOR ART

TINKLE-FREE KNITTED WIRE MESH FILTERS AND METHODS FOR MAKING SUCH FILTERS

FIELD

This disclosure relates to knitted wire mesh filters and methods of making such filters where the filters are completely free of "tinkles."

BACKGROUND

U.S. Pat. No. 5,217,515, which issued to Geno Guglielmi on Jun. 8, 1993 and is entitled "Abatement of Tinkles in Wire Mesh" (hereinafter the Guglielmi patent, the contents of which are incorporated herein in their entirety by reference), sets forth a long-standing problem in the field of filters made from knitted wire mesh, namely, the presence of "tinkles" (also known as "gotchas") in knitted wire mesh and thus in filters made from such mesh. The Guglielmi patent at column 1, lines 48-56, describes the source of tinkles as follows:

When knitted wire mesh is cut, it results in the production of loose pieces of scrap commonly known in the wire knitting industry as tinkles. The material making up the tinkles had formally been a portion of the knit. In other words, a tinkle is a knitted loop, or a portion of a knitted loop, which has been cut. Tinkles are of irregular shape and distribution and have no predetermined location, size or shape. However, they do tend to remain near the cut line where they were formed.

FIGS. 1 and 2 hereto are copies of the corresponding figures of the Guglielmi patent which show a knitted wire mesh sock 10 and its associated tinkles 20 formed when the sock was cut from a continuous length of wire mesh (a continuous tube of wire mesh) produced by a circular knitting machine. As described in the Guglielmi patent at column 3, lines 36-39: "Tinkles are portions of cut knit loops. They do not have a characteristic size or shape. Indeed, the act of cutting the mesh can distort the wire to produce shapes not found in the original knit." Having come from the knitted wire mesh, tinkles are composed of metal and are thus undesirable for most filter applications and impermissible for applications where the introduction of small pieces of metal into the gas or liquid stream being filtered cannot be tolerated, e.g., the filtering of the gases produced by an airbag inflator or the filtering of a fuel stream being provided to an internal combustion engine.

As described in the Guglielmi patent, efforts have been made to solve the tinkle problem by shaking the knitted wire mesh sock or picking the tinkles off by hand (Guglielmi patent at column 1, lines 59-61). These are highly labor-intensive processes and do not guarantee that filters made from the socks will be free of tinkles. As an alternative to trying to remove the tinkles, efforts have also been made to try to immobilize the tinkles. The Guglielmi patent represents one such effort in which electric resistance welding is used to bond tinkles to the wire mesh.

U.S. Pat. No. 5,849,054, which issued on Dec. 15, 1998 to Katsuhide Fujisawa and is entitled "Filter for an Inflator" (hereinafter the Fujisawa patent, the contents of which are incorporated herein in their entirety by reference), shows another immobilization approach in which, in making a filter, the sock is folded upon itself so that the cut ends of the sock end up buried inside the filter. FIG. 3 hereto is a copy of Fujisawa's FIG. 6(*b*') which shows a folded sock in which knitted wire mesh 15 covers cut ends 14 of the mesh.

As the Guglielmi and Fujisawa patents illustrate, the mindset of inventors working on knitted wire mesh filters has been to accept tinkles as a fact of life and then look for ways of dealing with the tinkles. Unfortunately, no matter how sophisticated a tinkle control technique may be, at the end of the day, there can be no guarantee that every last tinkle has been dealt with. As indicated above, for a variety of applications, e.g., in-line fuel filters, airbag inflators, and the like, such uncertainty can be unacceptable. As discussed fully below, in accordance with the present disclosure, a completely new approach has been taken to the tinkle problem, namely, to make knitted wire mesh filters without generating a single tinkle. In this way, for the first time, knitted wire mesh filters that are guaranteed to be tinkle-free can be made.

SUMMARY

In accordance with a first aspect, a method is disclosed for making a plurality of knitted wire mesh filters (19) each of which is free of tinkles (20) which comprises:
 (I) producing a knitted tube (11) that comprises (i) a plurality of segments (13) of knitted rows of wire and (ii) a plurality of segments (12) of knitted rows of yarn, the segments (13) of wire alternating with segments (12) of yarn;
 (II) producing a plurality of separated segments (13) of knitted rows of wire without cutting any loops of knitted wire and thus without producing any tinkles (20); and
 (III) producing the plurality of knitted wire mesh filters (19) from the plurality of separated segments (13) of wire; wherein step (II) comprises treating the knitted tube (11) or a separated portion thereof (i.e., a portion comprising at least one and, typically, multiple wire segments (13)) to remove yarn.

In accordance with a second aspect, a method is disclosed of making a plurality of knitted wire mesh filters (19) each of which is free of tinkles (20) comprising:
 (I) producing a knitted tube (11) that comprises (i) a plurality of segments (13) comprising knitted rows of wire and (ii) a plurality of segments (12) comprising knitted rows of yarn, the segments (13) comprising knitted rows of wire alternating with segments (12) comprising knitted rows of yarn;
 (II) producing a plurality of separated segments (13) comprising knitted rows of wire without cutting any loops of knitted wire and thus without producing any tinkles (20); and
 (III) producing the plurality of knitted wire mesh filters (19) from the plurality of separated segments (13) comprising knitted rows of wire;
wherein the segments (13) comprising knitted rows of wire are connected to one another by non-knitted sections of wire (16) that span the intervening segments (12) comprising knitted rows of yarn and step (II) comprises:
 (A) cutting segments (12) comprising knitted rows of yarn and non-knitted sections of wire (16) to free segments (13) comprising knitted rows of wire from the knitted tube (11); and
 (B) treating the freed segments (13) comprising knitted rows of wire to remove the yarn.

In accordance with a third aspect, a method is disclosed of making a plurality of knitted wire mesh filters (19) each of which is free of tinkles (20) comprising:
 (I) producing a knitted tube (11) that comprises (i) a plurality of segments (13) comprising knitted rows of wire and (ii) a plurality of segments (12) comprising knitted rows of yarn, the segments (13) comprising knitted rows of wire alternating with segments (12) comprising knitted rows of yarn;

(II) producing a plurality of separated segments (13) comprising knitted rows of wire without cutting any loops of knitted wire and thus without producing any tinkles (20); and (III) producing the plurality of knitted wire mesh filters (19) from the plurality of separated segments (13) comprising knitted rows of wire;

wherein step (II) comprises unweaving (18) of knitted yarn.

Tinkle-free wire mesh socks and tinkle-free wire mesh filters made from such socks are further aspects of the present disclosure.

The reference numbers used in the above summaries of the various aspects of the invention are only for the convenience of the reader and are not intended to and should not be interpreted as limiting the scope of the invention. More generally, it is to be understood that both the foregoing general description and the following detailed description are merely exemplary of the invention and are intended to provide an overview or framework for understanding the nature and character of the invention.

Additional features and advantages of the invention are set forth in the detailed description which follows, and in part will be readily apparent to those skilled in the art from that description or recognized by practicing the invention as exemplified by the description herein. The accompanying drawings are included to provide a further understanding of the invention, and are incorporated in and constitute a part of this specification. It is to be understood that the various features of the invention disclosed in this specification and in the drawings can be used in any and all combinations.

Figure 1:
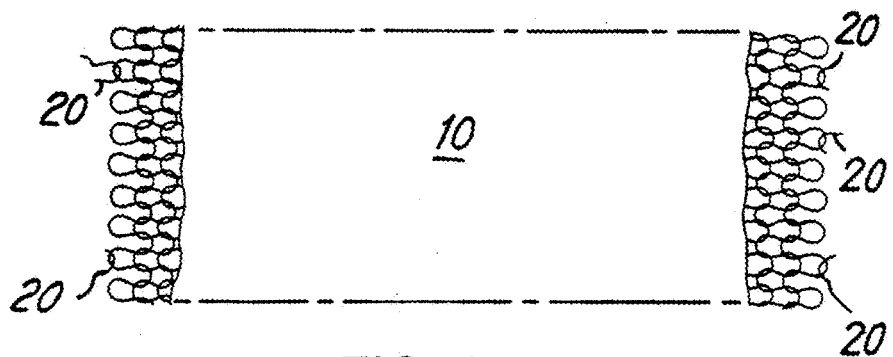
FIG. 1 is a schematic drawing illustrating a prior art knitted wire mesh sock and its associated tinkles.
Figure 2:
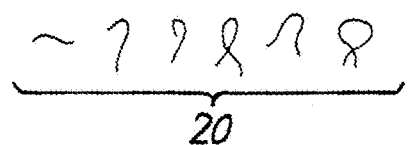
FIG. 2 is a schematic drawing illustrating some of the shapes exhibited by tinkles.
Figure 3:
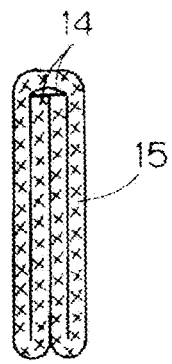
FIG. 3 is a schematic drawing illustrating a prior art attempt to deal with tinkles by locating them internally within a folded knitted wire mesh sock.

The reference numbers used in the figures refer to the following:

10 knitted wire mesh sock with associated metal tinkles—prior art
11 knitted tube
12 segment of knitted tube comprising knitted rows of yarn
13 segment of knitted tube comprising knitted rows of wire (when separated from its knitted tube, such a segment is referred to herein as a "sock")
14 cut end of knitted wire mesh—prior art
15 knitted wire mesh—prior art
16 non-knitted section of wire
17 non-knitted section of yarn
18 unwoven yarn
19 filter
20 metal tinkles—prior art
21 circular knitting machine
22 wire
23 spool for wire
24 knitting needles of circular knitting machine
25 yarn
26 spool for yarn
27 plate
28 apex for wire
29 apex for yarn
30 eyelet in plate for wire
31 eyelet in plate for yarn
32 feed eyelet for feeding wire to needles
33 feed eyelet for feeding yarn to needles
34 positioning cylinder for wire
35 positioning cylinder for yarn
36 plate
37 cam hub
38 timing stub

DETAILED DESCRIPTION

As discussed above, the present disclosure relates to the production of knitted wire mesh filters that are free of tinkles. In overview, the filters are made by: (1) producing a knitted tube having segments composed of wire and segments composed of yarn, (2) using the segments composed of yarn as the means for separating the segments composed of wire into individual (i.e., separated) wire mesh socks without the generation of tinkles, and (3) then using the tinkle-free wire mesh socks to make the filters.

Figure 4:
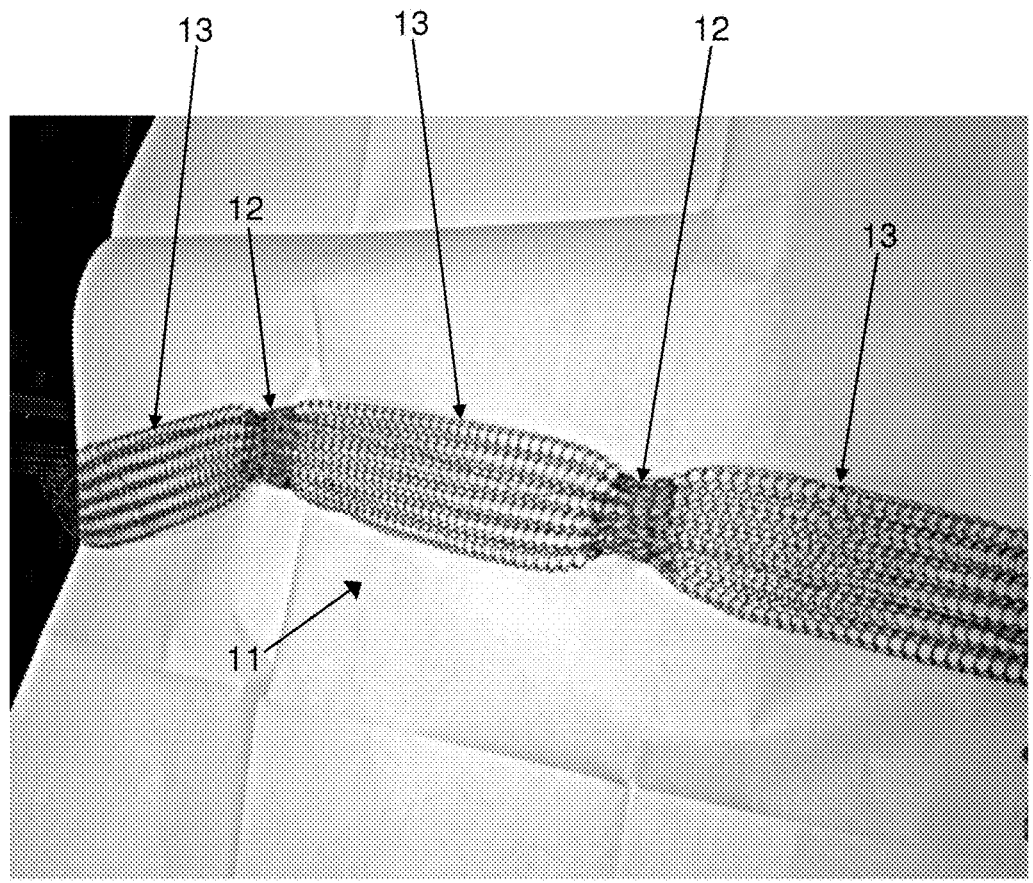
FIG. 4 is a photograph of a knitted tube prepared in accordance with an exemplary embodiment of the present disclosure.
Figure 5:
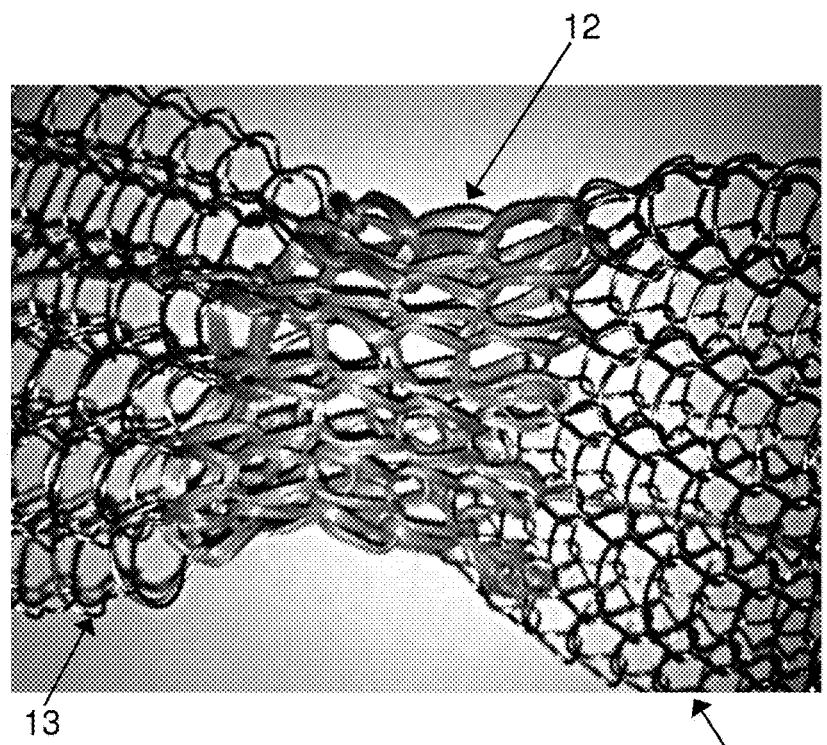
FIG. 5 is a close-up photograph showing a wire segment/yarn segment/wire segment portion of FIG. 4.

FIG. 4 shows a representative knitted tube 11 composed of alternating wire segments 13 and yarn segments 12, while FIG. 5 shows a close-up of the transition from one of the wire segments 13 to a yarn segment 12 and then to a another wire segment 13. As can be seen in this figure, as well as in FIG. 7 discussed below, yarn segments 12 are considerably shorter than wire segments 13. This will typically be the case in order to minimize the amount of yarn needed to make knitted tube 11, although longer yarn segments, including yarn segments longer than their abutting wire segments, can be used if desired. Typically, on the order of 3-5 rows of yarn per yarn segment has been found to work successfully.

Figure 6:
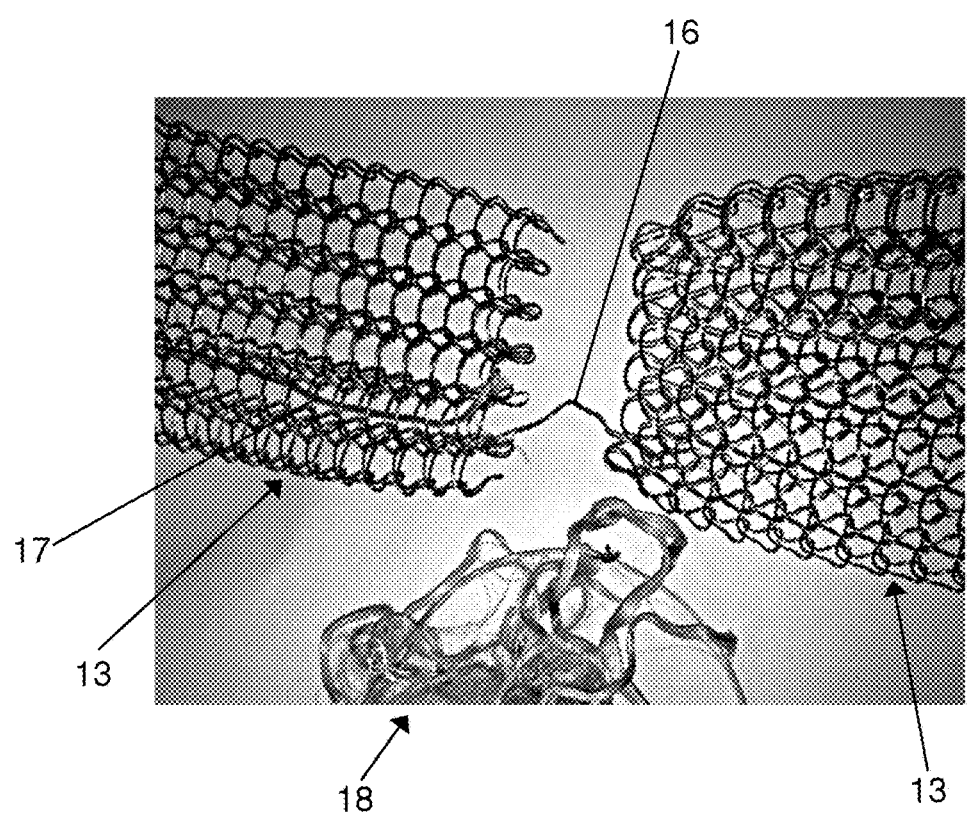
FIG. 6 is a photograph showing the structure of FIG. 5 with the yarn segment unwoven.

FIG. 6 shows the structure that results when yarn segment 12 of FIG. 5 is removed. As can be seen in this figure, wire segments 13 are connected to one another by a section of wire 16 that is not knitted. As discussed below in connection with FIG. 9, this non-knitted section of wire is produced as the circular knitting machine is knitting yarn. Similarly, when the circular knitting machine is knitting wire, a non-knitted section of yarn is created which can be seen at 17 in FIGS. 6 and 7.

As discussed more fully below, yarn segment 12 can be removed in various ways, in some of which the non-knitted section of wire 16 is cut before (or simultaneously with) the removal of the yarn segment. As shown in FIG. 6, the yarn segment has been removed by being unwoven leaving the non-knitted section of wire intact. In this figure, the unwoven yarn is shown at 18.

Figure 7:
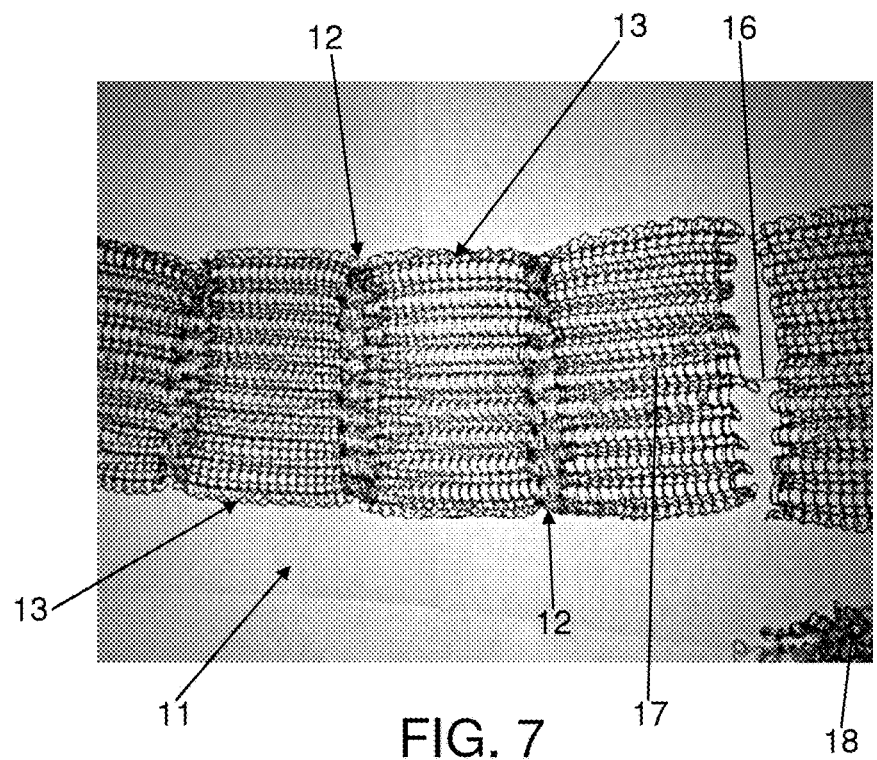
FIG. 7 is a photograph of a knitted tube prepared in accordance with another exemplary embodiment of the present disclosure. For purposes of illustration, the rightmost yarn segment in FIG. 7 has been unwoven.

FIG. 7 shows another representative knitted tube 11 having a different aspect ratio for the knitted wire mesh segments 13, i.e., in FIG. 4, the wire segments 13 are longer than they are wide, while in FIG. 7, they are wider than they are long. For example, the wire mesh segments in FIG. 4 can be on the order of 8 inches long by 2½ inches wide when flattened, while in FIG. 7, the segments can be on the order of 2 inches long by 3½ inches wide when flattened. In general terms, subject to the capabilities of the available circular knitting machines and the availability of yarn having the requisite breaking strength (see below), tinkle-free wire mesh socks of essentially any desired size, aspect ratio, density, and wire composition, configuration, and dimensions can be produced using the techniques disclosed herein. The ability to make wire mesh socks having a wide variety of properties, in turn, means that knitted wire mesh filters having a wide variety of properties can be made using the technology disclosed herein.

Figure 8:
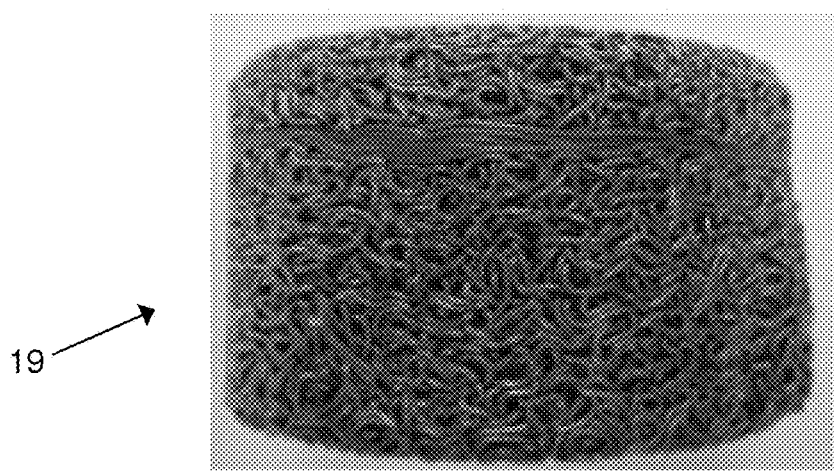
FIG. 8 is a photograph of an exemplary knitted wire mesh filter having a configuration suitable for use as a filter for an airbag inflator.

In particular, knitted wire mesh filters of the types now known or which may be developed in the future can be made using tinkle-free, knitted wire mesh socks produced in accordance with the present disclosure. As just one non-limiting example, FIG. 8 shows a knitted wire mesh filter 19 having a configuration suitable for use as the filter of, for example, an airbag inflator, which could be made from a tinkle-free, knitted wire mesh sock of the type disclosed herein. Commonly-assigned U.S. Pat. Nos. 7,025,797 and 7,559,146, the contents of which are incorporated herein by reference in their entireties, illustrate other filter configurations that can benefit from the technology disclosed herein. It should be noted that the tinkle-free, knitted wire mesh socks disclosed herein will primarily be used in making filters for applications where freedom from tinkles is important, but can also be used in other situations, if desired.

As noted above, there are a number of ways to remove yarn segments 12 from knitted tube 11. A preferred approach is to treat the knitted tube to remove the yarn. For example, the knitted tube can be treated with a solvent in which (i) the wire is insoluble and (ii) the yarn is soluble. The entire composition of the yarn need not be soluble in the solvent. For example, the yarn can comprise fibers that are bonded to one another by an adhesive (binder), with the adhesive, but not the fibers, being soluble in the solvent. By restricting the length of the fibers, the yarn will fall apart when the adhesive (binder) is removed.

A particularly preferred yarn comprises fibers, e.g., polyester fibers, which are bonded to one another by polyvinyl alcohol, the polyvinyl alcohol (but not the fibers) being soluble in water, which is a preferred solvent. Yarns composed of fibers, e.g., polyester fibers, bonded to one another by polyvinyl alcohol are commercially available for use in the manufacture of various consumer products, e.g., high loft towels, and thus in addition to the physical and chemical properties that make such yarns well-suited for use in the present technology, these yarns have the additional advantage that they are already being produced in large quantities and thus are relatively inexpensive.

When water is the solvent used in the treatment, it typically will be employed at an elevated temperature and indeed, the water may be entirely or partially in the form of steam at the time of use. The water (steam) can be applied to the yarn at various points in the process, e.g., it can be applied to an intact knitted tube produced by a run of a knitting machine, or it can be applied to a portion of a knitted tube which contains multiple yarn segments and has been separated from the main body of the tube by cutting at least one non-knitted section of wire, or it can be applied to an individual wire segment or a group of segments each having yarn on either or both of its ends, the wire segment(s) having been freed from the knitted tube by cutting at least one non-knitted section of wire. Other variations will be evident to those skilled in the art from the present disclosure.

The cutting of non-knitted sections of wire can be performed, for example, using a guillotine cutter located below a circular knitting machine or it can be performed offline. The cutting of the non-knitted sections of wire prior to the removal of the yarn produces cut knitted loops and cut portions of knitted loops, but these loops and portions of loops are not the troublesome tinkles of the prior art because rather being composed of metal, which cannot be removed, they are composed of yarn, which can be removed.

The yarn removal treatment can be performed online as the knitted tube is being formed or, more typically, will be performed offline in a separate processing operation. For a water (steam) treatment, equipment of the general type used to wash/sanitize kitchen utensils can be used to perform the yarn removal, with the water/steam being renewed at a sufficient rate so as not to compromise the rate of dissolution of the adhesive and to avoid the creation of a water/adhesive solution of high viscosity.

Although water (steam) is a preferred solvent for removing the yarn, other solvents which will not adversely affect the knitted wire, e.g., organic solvents, can be employed in the treatment step if desired. For example, alcohol can be used to dissolve nylon yarn. As a further, non-limiting, alternative, caustic solutions can be employed as the solvent. As with a water treatment, these solvents can dissolve all of the yarn or just a portion thereof, e.g., just an adhesive portion of the yarn. As another alternative in the treatment category, the yarn can be burnt off of the knitted wire, which can be advantageous in cases where the wire is going to be heat treated for other reasons, e.g., to anneal the wire of the wire mesh. However, burning off the yarn can lead to hard-to-remove chemical residues on the wire that are unacceptable for some applications.

In addition to the treatment approach for removing the yarn, unweaving of the knitted yarn can also be used if desired. The unweaving can be performed on a knitted tube or a portion thereof prior to cutting the non-knitted sections of wire to produce the separated wire mesh segments or can be performed on the separated wire mesh segments, the former approach being preferred. FIGS. 6 and 7 illustrate the unweaving approach applied to a portion of a knitted tube, where reference number 18 in these figures shows the unwoven yarn. The unweaving can be performed online as the knitted tube is being formed or offline, as desired. In should be noted that unlike trying to remove tinkles, unweaving can, in many cases, be performed by simply pulling a single thread to remove the entire knitted yarn. The treatment and unweaving approaches can be used in combination, if desired.

Figure 9:
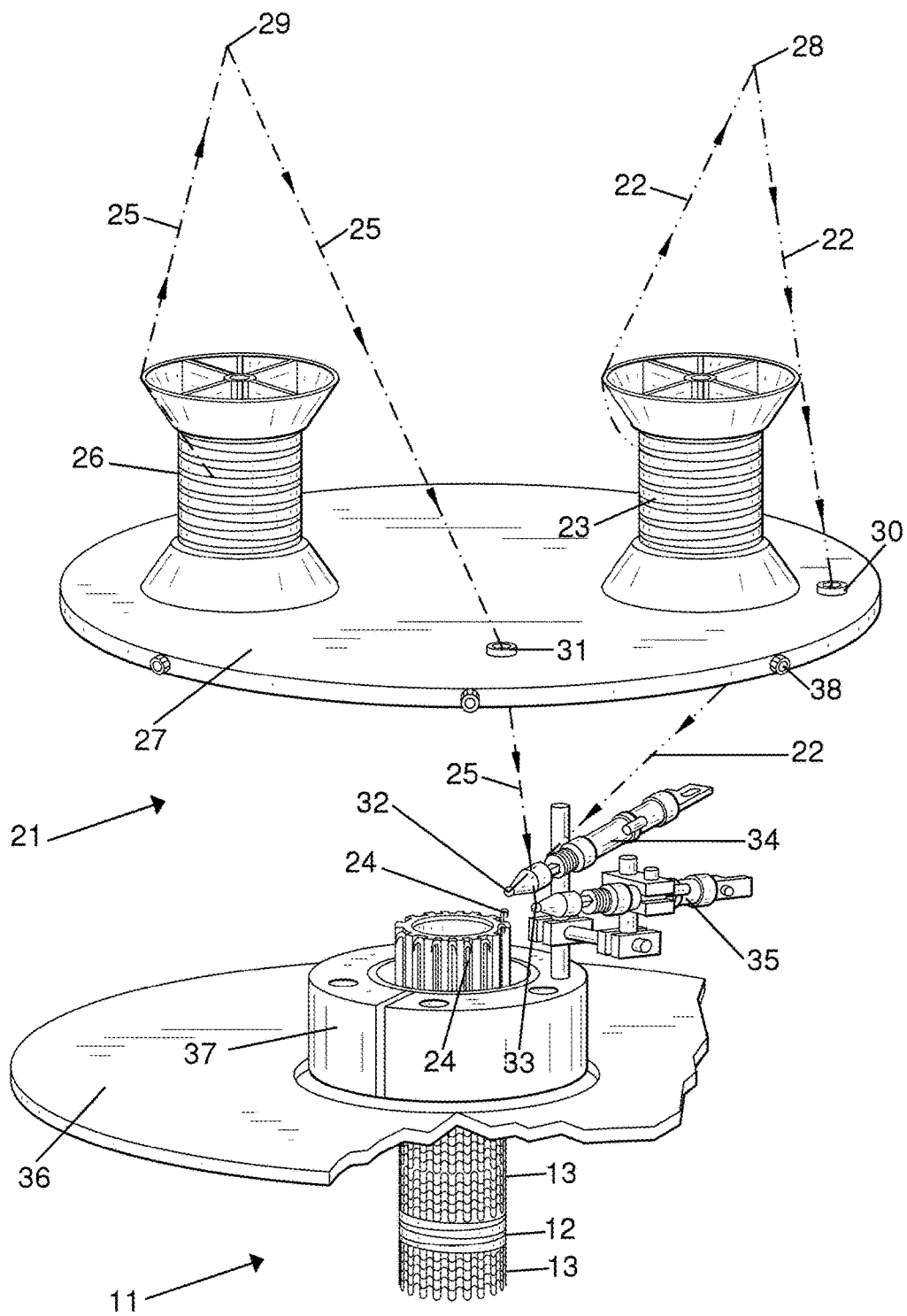
FIG. 9 is a schematic diagram illustrating an exemplary configuration for a circular knitting machine for use in preparing the knitted tubes of the present disclosure.

Knitted tube 11 can be produced by a variety of commercial or custom knitting machines, now known or subsequently developed. FIG. 9 is a schematic diagram of a representative commercial circular knitting machine 21 sold by Karl Müller GmbH Maschinenfabrik, Weissenburg, Germany, adapted for use in making knitted tube 11. So as not to obscure the discussion of the primary components of the machine, various conventional components, e.g., pulleys, tension monitors, drive mechanisms, electronic control equipment, etc., have been omitted from FIG. 9. Also, the rows of knitted yarn that make up yarn segment 12 of knitted tube 11 have not been explicitly shown in FIG. 9, again to facilitate the presentation.

In overview, circular knitting machine 21 feeds wire 22 from wire spool 23 to circular knitting needles 24 or feeds yarn 25 from yarn spool 26 to those needles. As is conventional, the wire or yarn travels upward to pulleys (not shown) located above plate 27 before turning downward at apices 28 and 29 and passing through eyelets 30 and 31 (e.g., ceramic eyelets) mounted in plate 27. The wire and yarn then pass through feed eyelets 32 and 33 (e.g., tungsten carbide eyelets) whose positions relative to circular knitting needles 24 are controlled by positioning cylinders 34 and 35 (e.g., non-rotating positioning cylinders of the type sold by Festo Corporation, Hauppauge, N.Y.). Positioning cylinders 34 and 35 are, in turn, controlled by pneumatic and programmed electronic control equipment.

In operation, the positioning cylinders determine whether wire or yarn is being knitted by knitting needles 24. Thus, when wire is to be knitted, positioning cylinder 34 moves feed eyelet 32 into position so that wire 22 is captured under the hooks of the knitting needles. Conversely, when yarn is to be knitted, positioning cylinder 35 moves feed eyelet 33 into position so that the needle's hook captures yarn 25. The positioning cylinders also move the wire/yarn feed eyelets away from the needles when the other material is being knitted. During such non-knitting periods, the material that is not being knitted continues to be fed from its spool and forms the non-knitted sections 16 and 17 of wire and yarn discussed above and illustrated in FIGS. 6 and 7.

In practice, a distance on the order of, for example, 25 millimeters between the knitting and non-knitting positions of the feed eyelets has been found to work successfully. To avoid the problem of double stitches, a stripper (not shown in FIG. 9) can be employed to hold the loops in position, i.e., to hold the loops down, as the needles move upwardly.

To produce a tube, either the circular array of knitting needles 24 needs to rotate past the positioning cylinders 34,35 or the positioning cylinders need to rotate around the array of knitting needles. In the former case, i.e., the rotating needles case, the knitted tube will rotate with the needles, which may be undesirable for some applications. FIG. 9 illustrates the latter case, i.e., the case where the positioning cylinders rotate around the array of knitting needles. Specifically, positioning cylinders 34,35 are mounted on cam hub 37 which surrounds the circular array of knitting needles 24 and rotates with plate 36. For this embodiment, plate 27, which carries spools 23 and 26, and is supported with standoffs (not shown) from plate 36, also rotates. To count the rotations or partial rotations of the plate and the hub, plate 27 can, for example, include a series of timing stubs 38 spaced along its perimeter to trigger a fixed sensor (not shown) to control sock length.

Once the tinkle-free wire mesh socks have been produced, they can be formed into tinkle-free wire mesh filters using a variety of techniques now known or subsequently developed. The filter can have a variety of configurations, including, without limitation, circular (disc-shaped), annular, elliptical (oval), triangular, square, octagonal, etc. Typically, the sock will be pressed into its desired shape using a compression mold, which in the case of an annular filter may include a mandrel and a plunger to produce a filter having an annulus with the desired physical dimensions, weight, and density.

The wire employed in producing the tinkle-free socks will be chosen based on the filtering requirements, the fluid (gas, liquid, or mixed phases) that is to be filtered, and the environment in which the filter will operate. Suitable materials for the wire include, without limitation, stainless steels, including austenitic and nickel alloys, such as, 304, 309, and 310 grades of stainless steel, or combinations thereof. The diameter of the wire will depend on the particular application of the filter. For example, the wire used for fabricating airbag filters can range from about 0.011 inches in diameter to about 0.03 inches in diameter (from about 0.35 mm to about 0.75 mm in diameter), although larger or smaller wires can be used, if desired. In the case of filters designed to filter fuel for an internal combustion engine, the wire diameters can range from about 0.001 inches to about 0.006 inches, although again larger or smaller wires can be used if desired. The cross-sectional shape of the wire will also depend on the particular application, with round and flat cross-sections being most common. As a further alternative, the filters of the present disclosure can employ wire that has been subjected to various types of processing to alter its properties. For example, additional strength can be obtained by heat treating.

Although typically a single type of wire will be used throughout the tinkle-free sock, a combination of two or more wires of different types, e.g., wires having different diameters, compositions, and/or geometries, can be knit into a single mesh if desired. Rather than using different types of wires in a single sock, a composite filter can be produced by compressing tinkle-free socks made of different types of wires into a single filter.

Yarns having a variety of compositions and structures can be used to produce the knitted tubes of the present disclosure. In general terms, the yarns will be metal free, but otherwise essentially any yarn that can be removed by the treatment and/or unweaving approaches discussed above can be used. Importantly, however, because yarn segments 12 need to interface with wire segments 13, the yarn needs to have sufficient strength properties to withstand the forces (takedown forces) applied to the yarn as the wire is being knitted. These forces increase as the diameter and strength of the wire increases and/or as the mesh becomes finer (tighter).

As a rule of thumb, to avoid damage to the wire while it is being knit, the maximum force applied to the wire is kept substantially below the yield strength of the wire, e.g., the knitting is performed at or below approximately 50-60% of the yield strength of the wire. Accordingly, the breaking strength of the yarn should be at least 50% of the product of the wire's yield strength times the wire's cross-sectional area. Quantitatively, for wire having a diameter in the range of 1 to 30 thousandths, the yield strength runs in the range of 20,000-150,000 psi, so that the yield strength times area product runs in the range from under 10 grams to over 100 pounds. Taking 50% of these values gives a representative range of breaking strengths for the yarn of from ~5 grams to ~50 pounds. A variety of yarns having breaking strengths in this range and above are commercially available. Also, individual strands of yarn can be wound together to achieve a net breaking strength value sufficiently high to withstand the forces associated with knitting the wire chosen for the filter. In particular, a variety of yarns composed of polyester fibers bonded to one another by a polyvinyl alcohol adhesive (PVA binder) and having a breaking strength for a single strand on the order of 20 pounds are commercially available at reasonable costs. By winding together ten or so strands of this yarn, breaking strengths in the above range or higher are easily achieved.

A variety of modifications that do not depart from the scope and spirit of the invention will be evident to persons of ordinary skill in the art from the foregoing disclosure. The following claims are intended to cover the specific embodiments set forth herein as well as modifications, variations, and equivalents of those embodiments.

What is claimed is:

1. A method of making a plurality of knitted wire mesh filters each of which is free of tinkles comprising:
   (I) producing a knitted tube that comprises (i) a plurality of knitted segments comprising knitted rows of wire, said knitted segments being referred to as knitted wire segments, and (ii) a plurality of knitted segments comprising knitted rows of yarn, said knitted segments being referred to as knitted yarn segments, the knitted wire segments alternating with the knitted yarn segments;
   (II) producing a plurality of separated knitted wire segments without cutting any loops of knitted wire and thus without producing any tinkles, where a separated knitted wire segment is a knitted wire segment that has been separated from the knitted tube of step (I); and
   (III) producing the plurality of knitted wire mesh filters from the plurality of separated knitted wire segments, each of the plurality of knitted wire mesh filters comprising a plurality of knitted rows of wire and being tinkle free;
wherein step (II) comprises treating the knitted tube or a separated portion thereof to remove yarn.

2. The method of claim 1 wherein the knitted tube or the separated portion thereof is treated with a solvent in which (i) the wire is insoluble and (ii) at least a portion of the yarn is soluble.

3. The method of claim 2 wherein:
   (i) the yarn comprises fibers that are bonded to one another by an adhesive;
   (ii) the fibers are insoluble in the solvent; and
   (iii) the adhesive is soluble in the solvent.

4. The method of claim 3 wherein the adhesive comprises polyvinyl alcohol and the solvent comprises water.

5. The method of claim 4 wherein the fibers comprise a polyester polymer.

6. The method of claim 1 wherein the breaking strength of the yarn is equal to or greater than 50 percent of the yield strength of the wire times the wire's cross-sectional area.

7. The method of claim 1 wherein the knitted tube is produced using a circular knitting machine.

8. A method of making a plurality of knitted wire mesh filters each of which is free of tinkles comprising:
   (I) producing a knitted tube that comprises (i) a plurality of knitted segments comprising knitted rows of wire, said knitted segments being referred to as knitted wire segments, and (ii) a plurality of knitted segments comprising knitted rows of yarn, said knitted segments being referred to as knitted yarn segments, the knitted wire segments alternating with the knitted yarn segments;
   (II) producing a plurality of separated knitted wire segments without cutting any loops of knitted wire and thus without producing any tinkles, where a separated knitted wire segment is a knitted wire segment that has been separated from the knitted tube of step (I); and
   (III) producing the plurality of knitted wire mesh filters from the plurality of separated knitted wire segments, each of the plurality of knitted wire mesh filters comprising a plurality of knitted rows of wire and being tinkle free;
wherein the knitted wire segments are connected to one another by non-knitted sections of wire that span the intervening knitted yarn segments and step (II) comprises:
   (A) cutting knitted yarn segments and non-knitted sections of wire to free knitted wire segments from the knitted tube; and
   (B) treating the freed knitted wire segments to remove the yarn.

9. The method of claim 8 wherein the cutting of step (II)(A) is performed on-line as the knitted tube is being produced.

10. The method of claim 8 wherein the cutting of step (II)(A) is performed off-line on a completed knitted tube.

11. The method of claim 8 wherein the freed knitted wire segments are treated with a solvent in which (i) the wire is insoluble and (ii) at least a portion of the yarn is soluble.

12. The method of claim 11 wherein:
   (i) the yarn comprises fibers that are bonded to one another by an adhesive;
   (ii) the fibers are insoluble in the solvent; and
   (iii) the adhesive is soluble in the solvent.

13. The method of claim 12 wherein the adhesive comprises polyvinyl alcohol and the solvent comprises water.

14. The method of claim 13 wherein the fibers comprise a polyester polymer.

15. The method of claim 8 wherein the breaking strength of the yarn is equal to or great than 50 percent of the yield strength of the wire times the wire's cross-sectional area.

16. The method of claim 8 wherein the knitted tube is produced using a circular knitting machine.

* * * * *